US009100683B2

(12) United States Patent
Bhogal et al.

(10) Patent No.: US 9,100,683 B2
(45) Date of Patent: Aug. 4, 2015

(54) OPTIMIZING VIDEO RECORDER POWER USAGE FOR DVR NETWORK

(75) Inventors: Kulvir Singh Bhogal, Pflugerville, TX (US); Gregory Jensen Boss, Saginaw, MI (US); Rick Allen Hamilton, II, Charlottesville, VA (US); Andrew R. Jones, Round Rock, TX (US); Brian Marshall O'Connell, RTP, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 534 days.

(21) Appl. No.: 13/302,135

(22) Filed: Nov. 22, 2011

(65) Prior Publication Data

US 2013/0133009 A1    May 23, 2013

(51) Int. Cl.
| | |
|---|---|
| *H04N 5/445* | (2011.01) |
| *H04N 21/4147* | (2011.01) |
| *H04N 21/472* | (2011.01) |
| *H04N 21/443* | (2011.01) |
| *H04N 5/76* | (2006.01) |
| *H04N 5/85* | (2006.01) |

(52) U.S. Cl.
CPC ....... *H04N 21/4147* (2013.01); *H04N 21/4436* (2013.01); *H04N 21/472* (2013.01); *H04N 5/76* (2013.01); *H04N 5/85* (2013.01)

(58) Field of Classification Search
CPC ....... H04N 5/76; H04N 5/85; H04N 21/4147; H04N 21/472; H04N 21/4436
USPC ................ 700/20, 291, 295, 296; 702/60, 62; 709/224; 380/270; 705/35; 707/769, 707/827, E17.01, E17.014; 725/58; 386/248, 298; 348/564
See application file for complete search history.

(56) References Cited

U.S. PATENT DOCUMENTS

| | | | | |
|---|---|---|---|---|
| 5,682,597 | A | * | 10/1997 | Ganek et al. ................. 455/3.04 |
| 5,724,646 | A | * | 3/1998 | Ganek et al. .................... 725/89 |
| 6,049,333 | A | * | 4/2000 | LaJoie et al. .................. 715/718 |
| 6,263,504 | B1 | * | 7/2001 | Ebisawa ........................ 725/101 |

(Continued)

FOREIGN PATENT DOCUMENTS

WO    WO2009097400    8/2009

OTHER PUBLICATIONS

Cable Television Laboratories, Inc. (CableLabs). Data-Over-Cable Service Interface Specifications 3.0 (DOCSIS 3.0). MAC and Upper Layer Protocols Interface Specification. V. 11. Oct. 9, 2009. pp. 463-468, 726-735.*

(Continued)

*Primary Examiner* — Nasser Goodarzi
*Assistant Examiner* — Michael B Pierorazio
(74) *Attorney, Agent, or Firm* — David A. Mims, Jr.; Damian Josephs; Robert V. Wilder

(57) ABSTRACT

A method, program product and system are provided for optimizing recording requests to minimize electricity usage for a network of DVRs. The disclosed methodology analyzes upcoming recording requests against a schedule guide including both local and networked DVRs. Overlaps in requested recordings and broadcasts during same or close proximity time slots are identified. Requested recordings are then rescheduled to optimally overlap recording times based upon the number of tuners in each DVR system. Changes in recording schedules are then communicated to other interconnected DVRs in a network.

18 Claims, 5 Drawing Sheets

(56) References Cited

U.S. PATENT DOCUMENTS

| | | | | |
|---|---|---|---|---|
| 6,453,115 | B1* | 9/2002 | Boyle | 386/351 |
| 6,798,971 | B2* | 9/2004 | Potrebic | 386/298 |
| 7,409,140 | B2* | 8/2008 | Rodriguez et al. | 386/248 |
| 7,505,081 | B2* | 3/2009 | Eshleman | 348/565 |
| 7,810,121 | B2* | 10/2010 | Patel et al. | 725/58 |
| 8,270,920 | B2* | 9/2012 | Chan et al. | 455/187.1 |
| 2002/0174430 | A1* | 11/2002 | Ellis et al. | 725/46 |
| 2002/0184638 | A1* | 12/2002 | Agnihotri et al. | 725/89 |
| 2003/0005454 | A1* | 1/2003 | Rodriguez et al. | 725/89 |
| 2003/0009401 | A1 | 1/2003 | Ellis | |
| 2003/0110514 | A1* | 6/2003 | West et al. | 725/134 |
| 2003/0177492 | A1* | 9/2003 | Kanou | 725/39 |
| 2003/0208767 | A1* | 11/2003 | Williamson et al. | 725/93 |
| 2003/0226150 | A1* | 12/2003 | Berberet et al. | 725/94 |
| 2004/0078829 | A1* | 4/2004 | Patel et al. | 725/135 |
| 2004/0133923 | A1* | 7/2004 | Watson et al. | 725/134 |
| 2004/0138834 | A1 | 7/2004 | Blackett | |
| 2005/0034171 | A1* | 2/2005 | Benya | 725/143 |
| 2005/0138663 | A1* | 6/2005 | Throckmorton et al. | 725/80 |
| 2008/0022347 | A1* | 1/2008 | Cohen | 725/134 |
| 2008/0092181 | A1* | 4/2008 | Britt | 725/87 |
| 2008/0127253 | A1* | 5/2008 | Zhang et al. | 725/35 |
| 2008/0184297 | A1* | 7/2008 | Ellis et al. | 725/39 |
| 2008/0244033 | A1* | 10/2008 | Hook et al. | 709/217 |
| 2009/0025027 | A1* | 1/2009 | Craner | 725/32 |
| 2009/0150941 | A1* | 6/2009 | Riedl et al. | 725/61 |
| 2009/0265124 | A1 | 10/2009 | Kagan | |
| 2009/0304361 | A1* | 12/2009 | Chan et al. | 386/124 |
| 2009/0310937 | A1* | 12/2009 | Ellis et al. | 386/83 |
| 2009/0320084 | A1* | 12/2009 | Azam et al. | 725/120 |
| 2009/0324203 | A1* | 12/2009 | Wiklof | 386/96 |
| 2010/0043022 | A1* | 2/2010 | Kaftan | 725/34 |
| 2010/0095323 | A1* | 4/2010 | Williamson et al. | 725/32 |
| 2010/0186025 | A1* | 7/2010 | Thomas et al. | 725/5 |
| 2010/0217613 | A1* | 8/2010 | Kelly | 705/1.1 |
| 2010/0218208 | A1* | 8/2010 | Holden | 725/32 |
| 2010/0235386 | A1 | 9/2010 | Zhao | |
| 2010/0242079 | A1* | 9/2010 | Riedl et al. | 725/115 |
| 2010/0246582 | A1* | 9/2010 | Salinger et al. | 370/392 |
| 2010/0251304 | A1* | 9/2010 | Donoghue et al. | 725/46 |
| 2010/0251305 | A1* | 9/2010 | Kimble et al. | 725/46 |
| 2010/0254386 | A1* | 10/2010 | Salinger et al. | 370/392 |
| 2010/0269146 | A1* | 10/2010 | Britt | 725/110 |
| 2010/0292854 | A1 | 11/2010 | Burg | |
| 2010/0293583 | A1* | 11/2010 | Loebig et al. | 725/109 |
| 2010/0306401 | A1* | 12/2010 | Gilson | 709/231 |
| 2011/0063126 | A1* | 3/2011 | Kennedy et al. | 340/870.02 |
| 2011/0138053 | A1* | 6/2011 | Khan et al. | 709/226 |
| 2011/0307929 | A1* | 12/2011 | Youssefmir et al. | 725/89 |
| 2012/0066371 | A1* | 3/2012 | Patel et al. | 709/224 |
| 2012/0117103 | A1* | 5/2012 | Farrelly et al. | 707/769 |
| 2012/0117339 | A1* | 5/2012 | Kandekar et al. | 711/159 |

OTHER PUBLICATIONS

Cable Television Laboratories, Inc. (CableLabs). Data-Over-Cable Service Interface Specifications 3.0 (DOCSIS 3.0). Operations Support System Interface Specification. V. 10. Oct. 9, 2009. pp. 310-328.*

Oriyano, Sean-Philip. Introduction to Software Load Balancing with Amazon EC2. Amazon Web Services. Sep. 21, 2008. Web. Retrieved Aug. 18, 2011. http://aws.amazon.com/articles/1639.*

Wikipedia. Digital video recorder. Web. Retrieved Sep. 11, 2008. http://en.wikipedia.org/wiki/Digital_video_recorder.*

Wikipedia. Load balancing (computing). Web. Retrieved Apr. 24, 2009. http://en.wikipedia.org/wiki/Load_balancing_(computing).*

Non-Final Office Action dated May 22, 2013, U.S. Appl. No. 13/302,334.

Amendment dated Jun. 1, 2013, U.S. Appl. No. 13/302,334.

U.S. Appl. No. 13/302,334, PTO-892 dated May 22, 2013.

U.S. Appl. No. 13/302,334, PTO-892 dated Oct. 8, 2013.

U.S. Appl. No. 13/302,334, IDS dated Nov. 22, 2011.

U.S. Appl. No. 13/302,334, IDS dated Jun. 15, 2013.

* cited by examiner

OPTIMIZING VIDEO RECORDER POWER USAGE FOR DVR NETWORK

FIELD OF THE INVENTION

The present invention relates generally to recording systems and more particularly to a system and methodology for reducing power requirements of video recording devices.

CROSS REFERENCE TO RELATED APPLICATIONS

This application is related to co-pending application Ser. No. 13/302,334, filed on even date herewith, assigned to the assignee of the present application and included herein by reference.

BACKGROUND OF THE INVENTION

A digital video recorder (DVR) or personal video recorder (PVR) is a device that records video in a digital format to a disk drive or other medium. The term includes stand-alone set-top boxes and software for personal computers which enables video capture and playback to and from disk.

DVRs provide several enhancements to similar devices such as VCRs, including convenient "time shifting". Additionally, a PVR enables "trick modes" such as pausing live TV, instant replay of interesting scenes, chasing playback and skipping advertising. Most DVRs use the MPEG format for encoding analog video signals.

As used herein, "time shifting" is the recording of programming to a storage medium to be viewed or listened to at a time more convenient to the consumer. "Chase play" is a time shifting facility of personal video recorders. It allows a user to simultaneously watch, stop or pause live television while continuing to record a program to its conclusion. "Instant replay" is a feature of DVRs, enabling a user to quickly review recently rendered video, "Pausing live TV" is a feature of PVRs that enables a user to stop the video and display a still frame. Often, the user may resume the video at the point the video was paused. "DVR" shall refer to both digital video recorders and also personal video recorders.

Notwithstanding the rapid and expansive development of video recording technology, little consideration has been given to the amount of power consumed by DVRs when a user schedules a number of broadcast events to be recorded. Power consumption of DVRs is quite significant considering that many households have at least one DVR either playing and/or recording broadcast events every day on a regular basis. Moreover, there has been no solution provided for minimizing power requirements in networked DVR Systems.

Thus, there is a need for an improved system and methodology for controlling the amount of power consumed by networked DVR devices in recording and playing broadcast video events.

SUMMARY OF THE INVENTION

A method, program product and system are provided for optimizing recording requests to minimize electricity usage for a network of DVRs. The disclosed methodology analyzes upcoming recording requests against a schedule guide including both local and networked DVRs. Overlaps in requested recordings and broadcasts during same or close proximity time slots are identified. Requested recordings are then rescheduled to optimally overlap recording times based upon the number of tuners in each DVR system. Changes in recording schedules are then communicated to other interconnected DVRs in a network.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
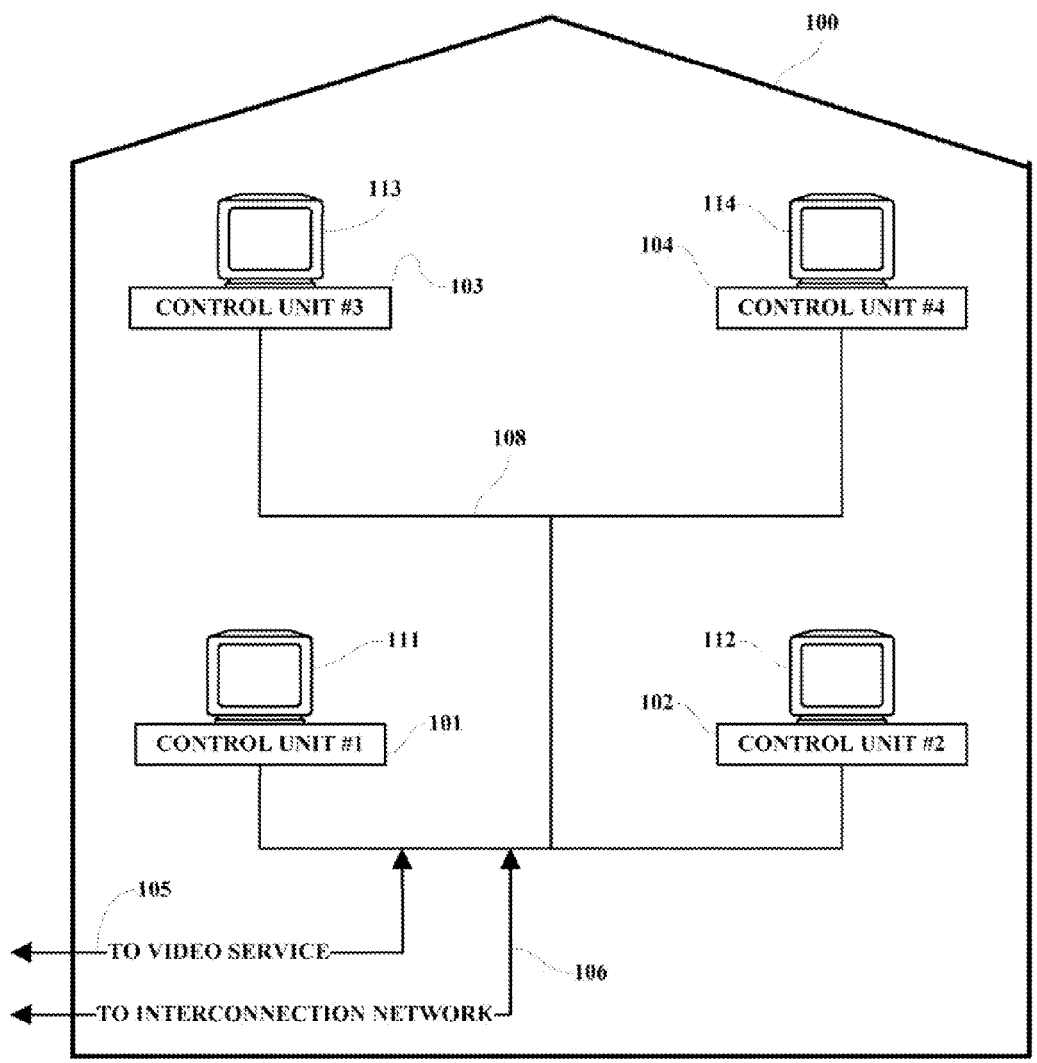
FIG. 1 is an illustration showing an exemplary environment in which the present invention may be implemented.

It is noted that devices which are shown in block or schematic form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The main embodiment is a system for advanced analysis of a DVR's recording schedule such that it is optimized to reduce energy consumption. Optimization is achieved by maximizing the number of recorded events at a given time by utilizing an optimal number of tuners contained in the DVR. The goal of the system is to allow the DVR to be in a reduced power state (sleep mode) and not record single broadcast events if the same event will be broadcast at a future time that coincides with other scheduled recording events.

With this background, certain advantages might be recognized by more intelligent scheduling of operations, including that of consumer electronics. In the present disclosure, a DVR would look to see if either a singularly scheduled show, or coincidentally scheduled shows, might be available during off-peak hours, and would reschedule recording during such times if possible. In brief, the exemplary processing steps include analyzing upcoming recording requests against a schedule guide (both local and networked DVRs); finding instances of only a single recording during a given time slot; find instances in the future where the requested recording is repeated during a time period in which there is only one recording being made; and rescheduling recordings to optimally overlap recording times based upon the number of tuners in the user's DVR such that an optimal number of tuners (e.g. both tuners in a two tuner system) are being used as much as possible during recording times in order to allow more inactive periods of time during which a DVR may remain in a low power-consuming "sleep mode". These rescheduling changes are also applied to networked DVRs to reduce overall DVR power consumption in a network of DVRs.

Another feature is the provision of a selection screen to a DVR user to enable the user to specify how much delay would be acceptable to the user in making the user-requested recording. For example, if a user will be away on a trip for a week, the user is enabled to input that a delay in making a requested recording of one week would be acceptable to the user since the user would be unable to view the recording until the user returns from the trip. In this case, the system is enabled to reschedule the user's requested recording (if it is the only recording being made during a given time slot) to another later broadcast of the same recording so that the re-scheduled recording would overlap another scheduled recording in order to have both tuners in a two tuner system working at the same time. After the rescheduling, the DVR, instead of being in a high power-consuming record state on two different occasions, is able to be in a record mode on only one occasion recording two requested recordings, and remain in a low power "sleep" mode during the other requested recording time slot.

This "acceptable recording delay" feature could also be accomplished automatically by the system in referencing the user's past viewing habits. For example, if the user's past history shows that the user views certain previously recorded shows only on weekends, the system could automatically use an acceptable delay in recording a show in future presentations occurring up to the next weekend.

In another example of rescheduling recording to a more cost-effective time, a user might nominally request a PBS Nova recording, occurring at 7 PM local time. The DVR, with knowledge of electrical consumption patterns such as those shown above, would search to discern other times that the show might be recorded. In doing so, it might note that the same PBS Nova episode will air again at midnight local time. It would nominally (but not required in the course of this invention) prompt the user to ensure that the delay is acceptable. If so, then the 7 PM recording is canceled, and the corresponding show would be recorded at midnight instead.

Such consumption time preferences could be innate, i.e. general heuristics programmed into the recording device ("record between 9 PM and 5 AM if possible"), or the device could receive periodic, accurate projections from the power utility or third party service provider tasked with projecting such peak and off-peak load expectations.

An optional preference system allows for the user to specify certain preferences that can be used to customize/optimize the above system and its methods, including but not limited to defining a minimum number of tuners for "optimal" definition and/or defining a maximum tolerable delay in rescheduling a recording event.

Additionally, the methods can be enhanced in ways such as applying cost analysis of savings of rescheduling an event and use that measure in determining a tolerable delay (e.g. For every $0.02 savings in energy cost, accept up to 2 days of delay). Additional logic may be inserted to shift recording of scheduled shows to times when electrical grids are known to operate beneath peak capacity. It is well recognized that loads on the electrical grid will vary by time-of-day, and day-of-week. The data clearly show not just variations by season, but that peak demands are established daily at critical times, e.g. late afternoon and early evening, then fall off significantly during the nighttime hours. It is further recognized that electrical generation capacity is sized according to such peak demands, and that shifting load from peak times into lower demand hours results in positive societal changes. These changes include reducing demand for overall generation capacity, reducing both money spent on new infrastructure as well as pollution. This latter point may be underscored by the fact that peak needs are often met by "peaker plants," which may be less efficient than persistent power sources.

Additionally, it may be noted that excess power generated during off-peak hours is often wasted, since few wide scale storage devices are currently in use at regional or national levels.

In general, the methodology associated with this enhancement follows the pattern:

(1) Accept recording of requested show;
(2) Scan listings to see if alternative times exist;
(3) Determine whether these alternative times are "power preferable" vis-a-vis the originally requested time;
(4) If so, optionally prompt the user (or determine from prior user input) whether the new time would be acceptable; and
(5) If user-acceptable, reschedule the requested show at the "power preferable" time. Note that power optimization may be achieved by optimizing tuner usage on a DVR as well as by re-scheduling to "power preferable" recording times. Both of these techniques may be used independently or in conjunction with one another.

The electronic programming guide for the DVR may also be augmented to change the background color of the program spaces based on the energy consumption required to record those individual programs. For example, if in order to record a program, a DVR must be turned on during peak hours those time slots may be colored red. However, if the DVR is already scheduled to record a program during a non-peak time period and has a free turner—that program slot may have a green background color.

With specific reference to the drawings, in FIG. 1 there is shown a building structure 100 which may be an office building or a user's home or other facility. The building 100 includes a local interconnection network 108 which is arranged to interconnect several display stations, each of which comprising a display device and a digital video recorder (DVR) control unit. As illustrated in the example, four DVR control units 101, 102, 103 and 104 are interconnected through the local interconnection network 108. Each of the DVR control units 101-104 is coupled to, and controls, a corresponding video monitor or display device 111, 112, 113 and 114, respectively. The control units 101-104 are connected together and to an external connection 105 to a video service such as a cable service company and also to another external connection 106 arranged for connection to another network such as the Internet, through which the DVR systems shown in FIG. 1 may be selectively connected to other DVR systems and networks. The control units 101-104 may also be connected through another external connection (not shown) to an external interconnection network such as the Internet for ultimate connection to remote servers and web sites. Thus, as illustrated, the DVR devices within the building 100 are connected together and may also be connected to external control units (not shown) at other locations through an Internet connection.

Figure 2:
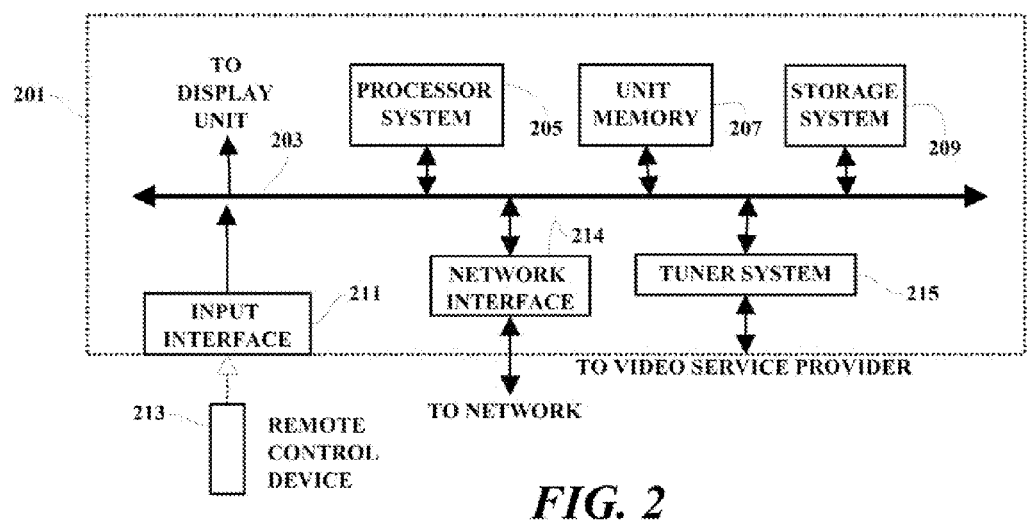
FIG. 2 is a schematic block diagram showing several of the major components of a digital video recorder control unit in an exemplary implementation of the present invention.

FIG. 2 shows several of the major components of an exemplary DVR control unit 201. The control unit 201 includes a main bus 203 to which is connected a processor system 205, a unit memory 207, a storage system 209, and an input interface 211. The main bus 203 is also coupled to a video or cable service through a tuner system 215. The input interface 211 also includes, for example, an infrared function for communicating with a hand-held remote control unit 213 through which a user is enabled to select programs to be recorded and played on one or more of the monitors 111-114. A network interface 214 is also connected to the main bus 108 and arranged for connection to an external network such as the Internet. A tuner system 215 is included in each of the control units 101-104 and may include one or more individual independent tuners. The tuners are operable to tune-in to a user selected channel in order to play or record video content being presented on that channel by the video service provider. Most currently available tuner systems are comprised of two tuners although it is possible to have more than two. With two tuners, a control unit user is able to play one channel while recording another or record two channels at the same time for example.

Figure 3:
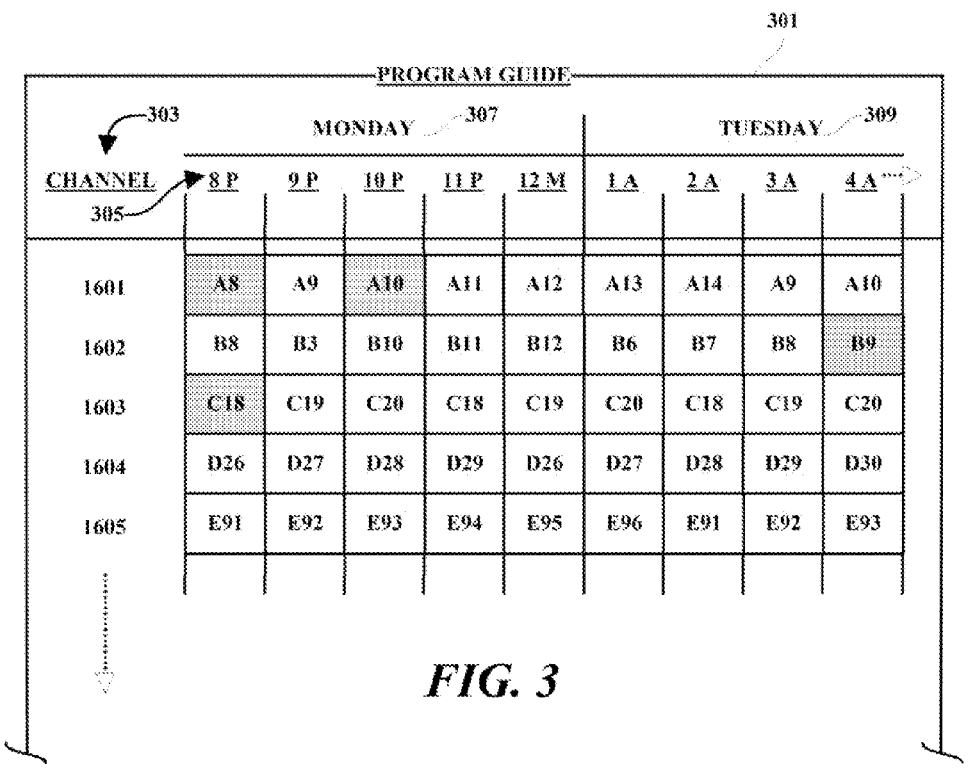
FIG. 3 is an illustration of an exemplary program guide useful in explaining an operation of the present invention.

FIG. 3 illustrates an exemplary Program Guide 301 which is selectively displayed to a user on a display screen of a monitor or display device 111-114. The Program Guide 301 includes, in a first column 303, the various channels which may be selected by the user. Also shown are various time slots 305 during which various programs, for example A8-A13 etc.) are scheduled to be presented. Each different program is represented by a different alpha-numeric designator. For example, A8, A9, A10, A11, etc., all represent different programs although a single program such as A10 may be listed in two or more time slots, for example Monday at 10 PM on channel 1601 and also the same program is replayed on Tuesday at 4 PM on channel. The user is enabled to control the selection of certain ones of the programs through the use of the remote control device 213. In an exemplary operation, it is presumed that Programs A8, A10, B9 and C18 have already been scheduled to be recorded as indicated by the darker shade. To record additional programs, the user will highlight a selected program on the Program Guide and push a "Record" button (not shown) on the remote control unit 213.

Figures 4, 5:
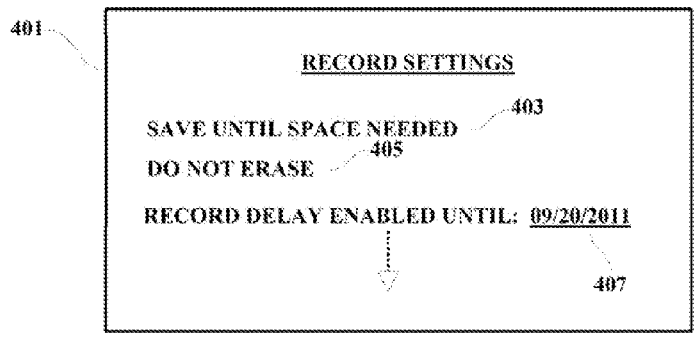
FIG. 4 is an example of a recording options screen which may be displayed to and completed by a user in an implementation of the present invention.
FIG. 5 is an illustration of an exemplary program guide in which system changes have been made to reduce power consumption in recording the programs selected by a user as shown in FIG. 3.

As shown in FIG. 4, when a user pushes the "Record" button on the remote control unit 213 a pop-up window 401 appears to receive the user's record preferences. Such preferences include whether the user wishes to save the scheduled recording only until storage space is needed 403 for a new recording, and whether the user wishes that the recording not be erased until done so manually by the user 405. Other options such as early start times or extended record times (not shown) may also be selected. Another option presented to the user in accordance with one embodiment of the present invention is the option to allow the actual recording of the event selected by the user to be delayed past the time of recording selected by the user in making the initial recording request. This option 407 will also enable the user to select a date by which the recording has to be made if the recording is to be delayed. The ability for the system to re-select a recording time if allowed by the user, enables the system to re-schedule the recording in order to achieve certain other benefits, including, inter alia, the ability to reschedule in order to achieve significant power savings. Such power savings may be realized by rescheduling the selected program to be recorded at a later time than the originally scheduled time when electricity rates may be lower or when the use of the tuners in the system may be optimized or overlapped to enable longer system "sleep" periods of low power consumption, as hereinbefore explained.

FIG. 5 illustrates an example of a Scheduled Recordings Listing 501 after the system has rescheduled a selected program for recording. As shown in FIG. 3, the user has originally selected to record the program A10 at 10 PM on Monday on channel 1601. For purposes of explanation it is assumed that the user has entered input to the "Record Settings" screen 401 to allow a later recording until a time later (e.g. Sep. 20, 2011) than the time slot originally scheduled. As herein explained, the system checks to see that in the original time slot 10 PM Monday, only a single tuner will be used. To optimize tuner utilization, the system looks for another time slot e.g. 4 AM Tuesday, during the user-authorized delay period 407 in which the selected program A10 may be recorded along with another selected program B9, such that both system tuners are utilized at the same time and power usage is optimized since the recording unit may now be shut down or put in a low power "sleep mode" at 10 PM Monday instead of being powered on at 10 PM Monday recording A10 and also at 4 AM Tuesday recording program B9 on channel 1602.

The selective recording delay feature may also be used to reschedule a selected recording from a prime-time high traffic time period where electrical costs are at a peak to a low traffic time period, within the user-authorized delay period 407, where electricity costs may be at a lower rate. Further, these different cost saving features, i.e. tuner optimization rescheduling and lower electricity rate time period rescheduling, may be implemented separately or concurrently to achieve significant power cost savings. For example, the program rescheduling illustrated in FIG. 5 may include both types of cost savings since a tuner optimization power saving is implemented as explained, and, assuming electricity is cheaper at 4 AM than it is at 10 PM, there is also a power saving by rescheduling the recording to a lower rate time period, thus a double cost saving advantage is achieved. The programming involved to implement the lower rate rescheduling would include a comparison of a pricing schedule available from a power company with the replayed program schedule from the program guide.

Figure 6:
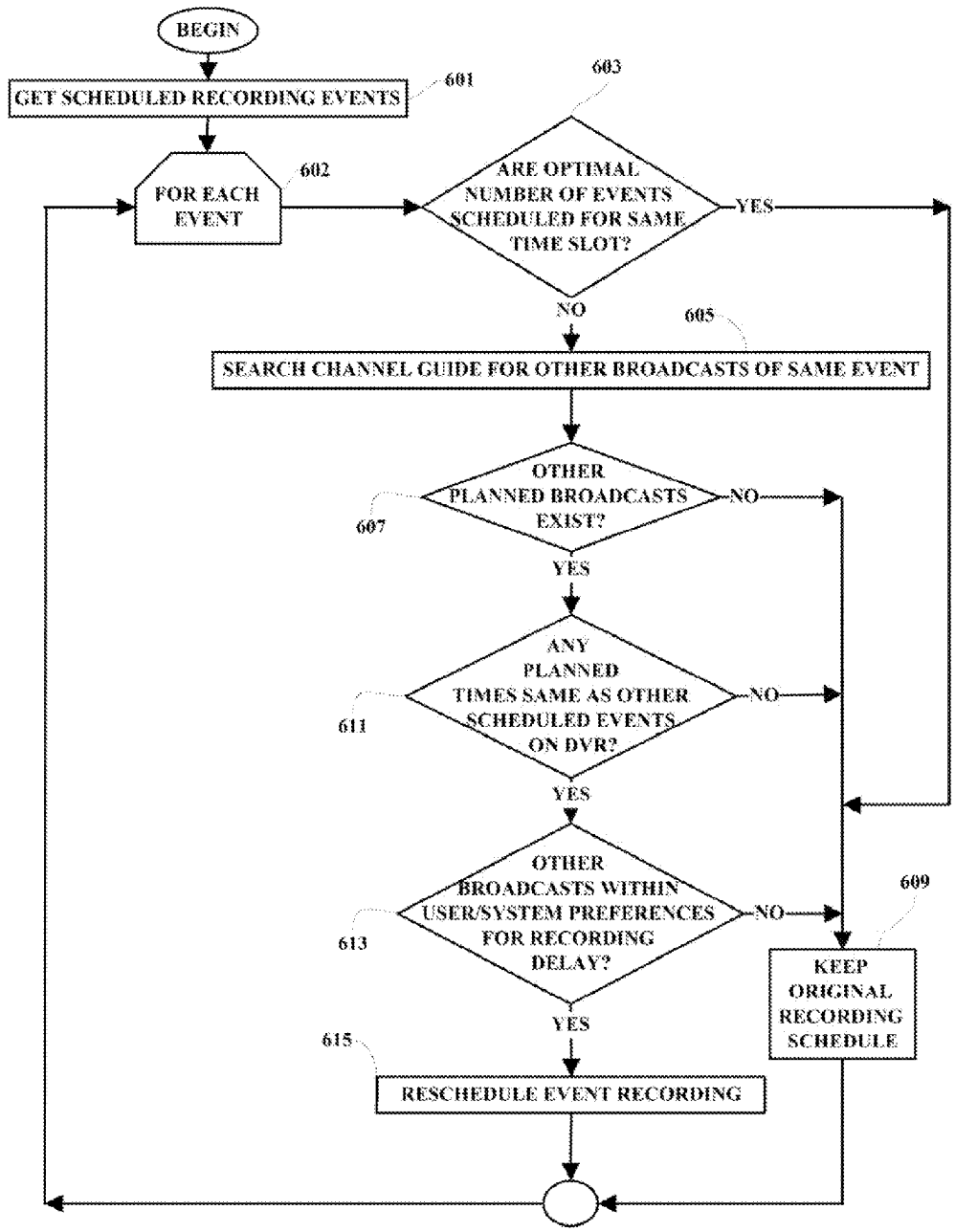
FIG. 6 is a flow chart illustrating an exemplary sequence of operations implemented in one exemplary embodiment of the present invention.

In FIG. 6, a flow diagram illustrates a sample logical implementation of the tuner optimization system and its methods. As a new event is scheduled for recording by a user, the system will gather all other scheduled recording events 601 and iterate on each event 602 as hereinafter noted. For each event, if other events are scheduled for the same or overlapping time slots 603, i.e. if an optimal number of events are scheduled for the same time slot, then the system retains the scheduled event as scheduled 609 and considers the next scheduled event 602. As discussed herein, the "optimal" number of events may be defined as some value above 1 and equal to the maximum number of tuners in the system. The end user may define this value or it may be defined by the system/DVR. If the considered event is in a time slot where there is not an optimal number of events scheduled to be recorded 603, then the channel guide or other programming data source is searched for other broadcasts of the same event or program 605. If no other broadcasts exist 607, then the original recording schedule is maintained 609 and the next scheduled recording is considered 602. If, however, other planned broadcasts exist for the program selected to be recorded 607, then a check is made to determine if any of the planned event times are the same as other scheduled events of the DVR 611. If not, then the original recording schedule is maintained 609 and the next scheduled recording is considered 602. If, however, a re-play time for a selected event overlaps with another scheduled broadcast 611, and the other broadcast is within the user or system preferences for a recording delay 613, then the user-selected event is rescheduled to be recorded at the later time via one tuner along with the recording of the previously existing event which can be recorded via a second tuner. If the re-play of the user-selected event overlaps with a previously scheduled recording event 611 but the common time slot is not within the user or system preferences for a recording delay 613, then the original recording schedule is maintained 609 and the next scheduled recording is considered 602.

Figure 7:
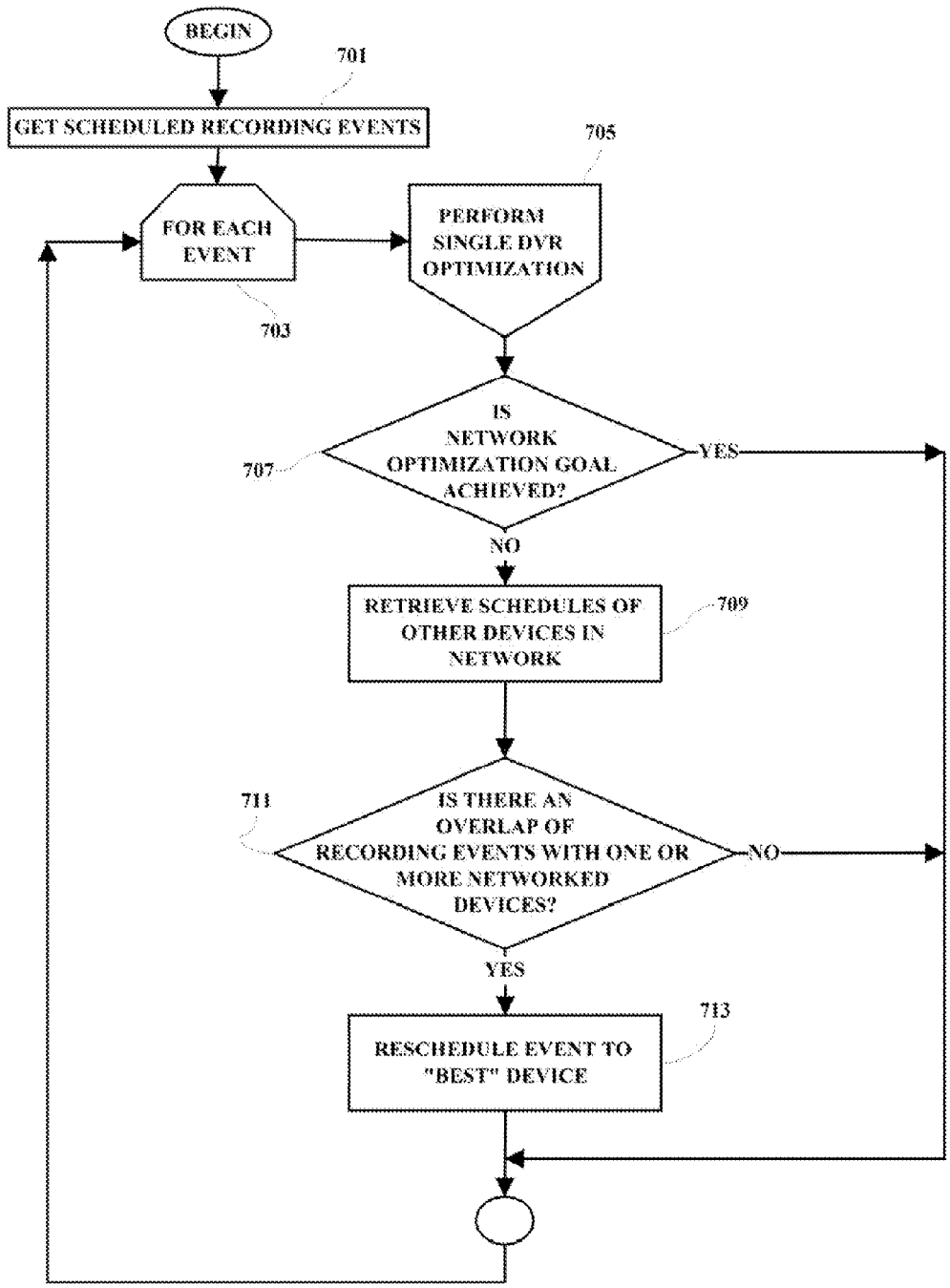
FIG. 7 is a flow chart illustrating an exemplary sequence of operations implemented in an exemplary network embodiment of the present invention.

In FIG. 7, there is shown a flow chart illustrating an exemplary sequence of operations implemented in an exemplary network embodiment of the present invention. As shown, when a recording has been scheduled, the scheduled recording events for all of the DVRs in a network are accessed 701 and for each scheduled recording event 703, the DVR recording optimization as illustrated in FIG. 6 is performed 705. Next, it is determined if the network optimization goal has been achieved 707 and if so, the processing continues with the next scheduled recording event 703. This value may be a system or user preference. The network optimization goal may be a complex set of values. For example, the network optimization goal may include when all tuners are utilized on most energy efficient DVR, and/or when all tuners utilized on most energy efficient DVR unless a scheduled recording is only to be viewed by adults so that a specific device for those events will be used. Another optimization goal may be to insure that tuners are utilized during times when energy demand on the energy grid is low. A shift in grid usage may cause a recalculation of all recording times. A DVR network may also include user or system preference for tolerable delays as previously discussed 407 in connection with a single DVR system. If however, the network optimization goal has not yet been achieved 707, then the schedules of other DVR devices in the network are retrieved, 709 and it is determined if there is an overlap of recording events with one or more networked DVR devices 711. If there is no overlap, then the processing continues for the next scheduled recording event 703. If, however, there is an overlap of recording events with one or more networked DVR devices 711, then the scheduled event is re-scheduled to the "best" device 713, which may be for example the most energy efficient device, in order to optimize power requirements for recording the scheduled event.

In addition to checking electronic program guides for scheduled recording events, one embodiment includes analyzing other options for obtaining the scheduled broadcast such as availability on the DVR's on-demand system or some other third party on-demand system. This analysis could include factors such as cost, download time, etc. versus energy costs.

A program as recorded on a "distant" device, i.e., a networked DVR pursuant to the above power-saving analysis, could be brought over to the primary device in any of several ways. For example, a recorded event may be retrieved by a primary device during a non-peak time, such as might occur during the nighttime hours. Once both DVRs are powered on, for whatever reasons, such a transfer does not incur additional "power on" times. A recorded event may also be retrieved on demand by a user, or in the course of watching the recorded show, wherein the video is served from the remote device. Further, the scheduling management may occur in any of several manners such as using a centralized database of scheduling server with knowledge of all (within some geographic constraints) requested shows.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a computer program product comprising a computer-readable, tangible storage device(s) and computer-readable program instructions stored on the computer-readable, tangible storage device(s) in any media, including any portable or fixed, volatile or non-volatile memory media device, including CDs, RAM and "Flash" memory, or other semiconductor, optical, magnetic or other memory media capable of storing code. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A computer-implemented method for optimizing power requirements of a video recorder system in recording video programs selected for recording by a user input to a user video recorder, said user video recorder being configured for being interconnected with other video recorders in a network, said method comprising:

receiving a user request to record a selected video program at a user selected recording time;

in response to said receiving, immediately searching a program listing to determine if said selected video program is scheduled to be played at a different time than said user selected recording time;

if it is determined that said selected video program is scheduled to be played at said different time, then searching a listing of programs scheduled to be recorded on digital video recorders (DVRs) in said network to find an available DVR, said available DVR including at least two tuners wherein only one of said tuners is scheduled to be recording a video program at said different time;

determining that recording said selected video program on said available recorder in said network instead of said user video recorder would result in a cost savings to said user, said cost savings being realized by enabling at least partially concurrent operation of said two or more tuners of said available recorder in recording said selected video program at said available recorder; and automatically recording of said selected video program at said available recorder without further user input, in response to said determining of said cost savings to said user.

2. The method as set forth in claim 1 wherein said cost savings results from said available recorder being enabled to record said selected video program at less cost to said user than recording said selected video program on said user video recorder.

3. The method as set forth in claim 2 wherein said cost savings results from said available recorder having lower power requirements than said user video recorder.

4. The method as set forth in claim 1 wherein said different recording time is during a period when electrical energy usage rates are lower than during said user selected recording time.

5. The method as set forth in claim 1 and further including:
providing a recording delay period, said recording delay period being representative of an acceptable maximum delay for delaying a recording of said selected video program from said user selected recording time to a time subsequent to said user selected recording time;
determining by said video recorder system of a subsequent recording time at which said selected video program is being re-broadcast;
determining that said subsequent recording time is within said recording delay period;
determining that a recording of said selected video program at said subsequent recording time at said available recorder would result in said operational cost savings; and
recording of said selected video program at said available recorder at said subsequent recording time instead of said user selected recording time.

6. The method as set forth in claim 5 wherein said recording delay period is determined by said user.

7. The method as set forth in claim 5 and further including:
presenting a user selection screen to said user on said display device in response to said receiving, said user selection screen being operable for enabling said user to input said recording delay period.

8. The method as set forth in claim 5 wherein said recording delay period is a pre-set value applied by said video recorder system.

9. The method as set forth in claim 5 wherein said selected video program is recorded at said user selected recording time if said subsequent recording time is not within said recording delay period.

10. A computer program product comprising one or more computer-readable, tangible storage devices and computer-readable program instructions stored on the one or more computer-readable, tangible storage devices for optimizing power requirements of a video recorder system in recording user selected video programs selected for recording by a user input to a user video recorder, said user video recorder being configured for being interconnected with other video recorders in a network, the computer-readable program instructions, when executed by a processing system, being operable for implementing a method comprising:
receiving a user request to record a selected video program at a user selected recording time;
in response to said receiving, immediately searching a program listing to determine if said selected video program is scheduled to be played at a different time than said user selected recording time;
if it is determined that said selected video program is scheduled to be played at said different time, then searching a listing of programs scheduled to be recorded on digital video recorders (DVRs) in said network to find an available DVR, said available DVR including at least two tuners wherein only one of said tuners is scheduled to be recording a video program at said different time;
determining that recording said selected video program on said available recorder in said network instead of said user video recorder would result in a cost savings to said user, said cost savings being realised by enabling at least partially concurrent operation of said two or more tuners of said available recorder in recording said selected video program at said available recorder; and
automatically recording of said selected video program at said available recorder without further user input, in response to said determining of said cost savings to said user.

11. The computer program product as set forth in claim 10 wherein said cost savings results from said available recorder being enabled to record said selected video program at less cost to said user than recording said selected video program on said user video recorder.

12. The computer program product as set forth in claim 11 wherein said cost savings results from said available recorder having lower power requirements than said user video recorder.

13. The computer program product as set forth in claim 11 wherein said different recording time is during a period when electrical energy usage rates are lower than during said user selected recording time.

14. The computer program product as set forth in claim 10 and further including:
providing a recording delay period, said recording delay period being representative of an acceptable maximum delay for delaying a recording of said selected video program from said user selected recording time to a time subsequent to said user selected recording time;
determining by said video recorder system of a subsequent recording time at which said selected video program is being re-broadcast;
determining that said subsequent recording time is within said recording delay period;
determining that a recording of said selected video program at said subsequent recording time at said available recorder would result in said operational cost savings; and
recording of said selected video program at said available recorder at said subsequent recording time instead of said user selected recording time.

15. The computer program product as set forth in claim 14 wherein said recording delay period is determined by said user.

16. The computer program product as set forth in claim 14 wherein said method further includes:
presenting a user selection screen to said user on said display device in response to said receiving, said user selection screen being operable for enabling said user to input said recording delay period.

17. The computer program product as set forth in claim 14 wherein said recording delay period is a pre-set value applied by said video recorder system.

18. A video recorder system for optimizing power requirements in recording video programs selected for recording by a user input to a user video recorder, said user video recorder being configured for being interconnected with other video recorders in a network, said system comprising:

receiving means for receiving a user input request to said user video recorder to record a selected video program at a user selected recording time;

a computer system operable in response to said user input request for searching a program listing to determine if said selected video program is scheduled to be played at a different time than said user selected recording time;

said computer system being further operable, if said selected video program is scheduled to be played at a different time than said user selected recording time, for immediately searching a listing of programs scheduled to be recorded on digital video recorders (DVRs) in said network to find an available DVR, said available DVR including at least two tuners wherein only one of said tuners is scheduled to be recording a program at said different time;

said computer system being further operable for determining that recording said selected video program on available recorder in said network instead of said user video recorder would result in a cost savings to said user, said cost savings being realized by enabling at least partially concurrent operation of said two or more tuners of said available recorder in recording said selected video program at said available recorder, said computer system being operable in response to said determining for automatically enabling said available recorder to record said selected video program without further user input.

* * * * *